Aug. 3, 1954 J. A. MERKLE 2,685,318
JACKET FOR DRINKING GLASSES
Filed Sept. 30, 1950
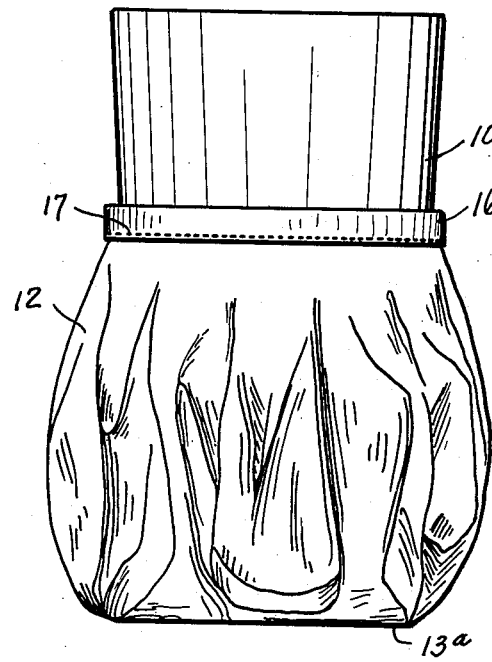
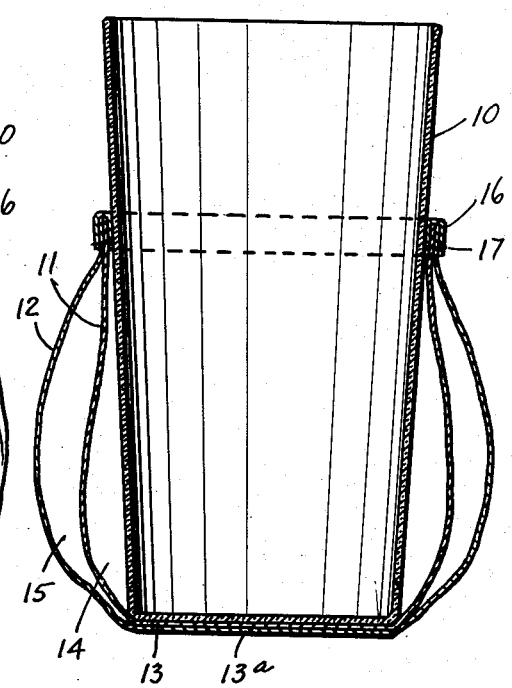
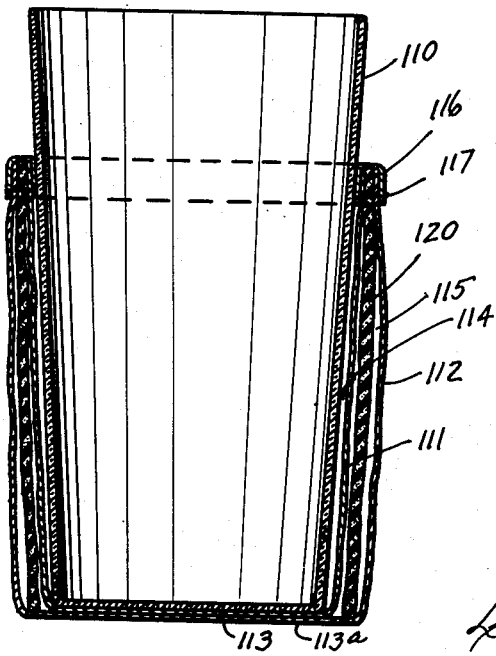
INVENTOR.
JOHN A. MERKLE.
BY
Lockwood, Hahn, Galt & Woodard,
ATTORNEYS.

Patented Aug. 3, 1954

2,685,318

UNITED STATES PATENT OFFICE 2,685,318

JACKET FOR DRINKING GLASSES

John A. Merkle, Indianapolis, Ind.

Application September 30, 1950, Serial No. 187,788

4 Claims. (Cl. 150—52)

This invention relates to a jacket for drinking glasses and the like, and more particularly to an article of manufacture that is so designed that no moisture condensation will be formed thereon.

It is the primary object of this invention to eliminate, as aforesaid, the condensation of moisture that results particularly in connection with drinking glasses containing ice cubes. It is common knowledge that moisture in, for example, the air of a room will condense upon surfaces that have a temperature that is lower than that of the surrounding air. It is equally well known that a drinking glass that includes ice cubes therewithin is particularly "allergic" to this natural phenomenon. Many disadvantages flow therefrom. For example, considerable damage and defacement is caused table tops and the like; water drips from the glass onto the clothing; and the hand gripping the glass is wetted, and the moisture thereafter transferred to any article that is touched. These and other inconveniences are known to all.

It is a still further object of this invention to provide a jacket of such character that it may easily and readily be collapsed for storage or shipment purposes.

It is a still further object of this invention to provide a jacket of such character that it may effectively be used with drinking glasses of various sizes.

It is a still further object of this invention to provide a jacket of resilient character having an inner and an outer wall, both walls normally ballooning outwardly relative to the contour of the ordinary drinking glass. With this arrangement only the bottom thereof is normally in engagement with the wall of the glass except when hand grasped. As a result, there is no opportunity for the temperature of the glass to be transferred to the inner jacket wall and from thence to the outer wall. The only exception occurs when the glass and jacket are hand grasped. But at such times the heat of the hand will offset any lowering of temperature of the inner and outer walls, thereby preventing any jacket "sweating."

It is a still further object of this invention to provide jacket mouth defining means of such a material that any water dripping downwardly from the uncovered portion of the glass will be absorbed thereby and prevented from dampening the wall of the jacket.

The primary feature of the present invention resides in the provision of normally spaced inner and outer jacket walls which form a dead air space therebetween, said walls being of such character and construction that the greater portions thereof normally balloon outwardly from engagement with the side wall of the glass.

The full nature of the invention will be understood from the accompanying drawings and the following description and claims:

In the drawings, Fig. 1 is a side elevation view of the invention in drinking glass enveloping position.

Fig. 2 is a vertical section view thereof.

Fig. 3 is a vertical section view of a drinking glass and of a modified form of the invention.

In the drawings, an ordinary drinking glass is shown at 10. The jacket adapted to envelop it comprises inner, outer and bottom walls 11, 12, 13 and 13a respectively, they being formed of flexible plastic or any other suitable material of resilient character that is impervious to air and moisture. The walls may be formed of a single blank of material with the free ends thereof being suitably fused as by vulcanizing. Or two separate pieces may be fabricated with the upper margin thereof being firmly secured and "sealed" by stitching or the like. Regardless of what method of fabrication is followed, it is essential that both the inner and outer walls be formed so that they normally balloon outwardly relative to the wall of the glass and to each other as shown, thereby forming the dead air space 14 and the space 15. To state it in another way the walls balloon outwardly relative to their longitudinal axis, although the outer wall does so more than the inner. This characteristic is of significance, in that it causes the walls of the jacket to space themselves automatically once the glass is set down and the hand removed therefrom.

In order that the jacket may firmly embrace the glass regardless of its size, there is provided a jacket mouth-defining band 16 of linearly expansible and absorbent character. The band is substantially U-shaped in cross section and is secured in inverted relation about the jacket margins by the stitching 17 or the like.

Once the jacket has been formed as described, it is only the bottom wall 13 thereof that normally engages the glass. The side walls 11 and 12 are normally ballooned outwardly as aforesaid, while the upper margins have a portion of the band interposed between them and the glass. This construction is peculiarly effective in eliminating the condensation of moisture on the enveloped portion of the glass and on the outer jacket wall. On the other hand, conventional jackets engage and embrace the drinking glass, thereby having their temperature lowered with the result that moisture condenses rapidly thereon.

A modification of the invention is shown in Fig. 3. It has inner, outer and bottom walls 111, 112, 113 and 113a formed in the same fashion as mentioned above, with the exception that the outwardly ballooning effect is not nearly so marked nor pronounced. Interposed in the dead air space 115 between said inner and outer walls is the annular insert 120 of resilient character such as foam or sponge rubber. This open-ended insert is stitched as at 117 or otherwise suitably secured to the upper margins of said side walls and to the band 116. By providing said insert it is not necessary to form said side walls in the same outwardly ballooning fashion as is desirable in connection with the representation of Figs. 1 and 2. The reason is because the insert prevents a transfer of the temperature of the inner wall to the outer wall even when the jacket is hand grasped. Consequently, in the modification, the contour of said side walls may approximate that of the glass 110, although the cross sectional area of said walls still should be of greater area than that of said glass. While the height of the jacket is a matter of some choice, it is desirable to form it so that it extends slightly above the longitudinal center of the glass. By reason of the absorbent qualities of the band 116, any moisture dripping from the exposed portion of the glass will be prevented by the band from reaching the outer side wall of the jacket. Consequently that wall, in both modifications of the invention will remain dry. Furthermore, by reason of applicant's invention, the wall of the glass below the jacket band will also remain dry, thereby eliminating the possibility of damage to tables, clothing and the like when the jacket is for any purpose removed from the glass.

A still further way of accomplishing the end result heretofore described, is through the injection of air or gas under pressure within the space between the inner and outer walls. If this alternative is followed, it of course is not necessary that the walls be formed of a flexible or resilient material. It is only necessary that the material used be impervious to the passage therethrough of the pressure medium. That medium will, when injected under sufficient pressure, cause the desired spacing of the outer wall relative to the inner. This spacing will be substantially maintained even when the jacket is hand grasped.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A jacket for a drinking glass, comprising an annular body portion open at least at one end and being substantially impervious to moisture and air, said portion including inner and outer walls of resilient character, the inside diameter of said outer wall being appreciably greater throughout most of its length than the outside diameter of said inner wall to form a dead air space therebetween, the inside diameter of said inner wall being appreciably greater throughout most of its length than the outside diameter of said glass whereby the greater portion of said walls are normally disposed in spaced relation to said glass and to each other, and annular glass embracing means for closing said dead air space.

2. A jacket for a drinking glass, comprising an annular body portion open at least at one end and being substantially impervious to moisture and air, said portion including inner and outer walls, the inside diameter of said outer wall being appreciably greater throughout most of its length than the outside diameter of said inner wall to form a dead air space therebetween, the inside diameter of said inner wall being appreciably greater throughout most of its length than the outside diameter of said glass whereby the greater portion of said walls are normally disposed in spaced relation to said glass and to each other, and a linearly expansible glass embracing member secured to said walls adjacent their upper marginal edges.

3. A jacket for a drinking glass comprising an annular body portion open at one end and being substantially impervious to moisture and air, said portion including inner and outer walls of resilient character, said walls normally ballooning outwardly relative to the longitudinal axis of said jacket throughout most of their length, and a glass embracing means securing said walls adjacent their marginal edges.

4. A jacket for a drinking glass comprising an annular body portion open at least at one end and being substantially impervious to moisture and air, said portion including inner and outer walls of resilient character, said walls normally ballooning outwardly relative to the longitudinal axis of said jacket throughout most of their length, the inside diameter of the outer wall being appreciably greater throughout most of its length than the outside diameter of said inner wall to form a dead air space therebetween, and linearly expansible glass embracing means securing said walls adjacent their marginal edges.

References Cited in the file of this patent

UNITED STATES PATENTS

| Number | Name | Date |
| --- | --- | --- |
| 747,025 | White | Dec. 15, 1905 |
| 1,267,292 | Vanstrom | May 21, 1918 |
| 1,464,525 | Girr | Aug. 14, 1923 |
| 1,669,061 | Meltzer | May 8, 1928 |
| 1,687,004 | Briggs | Oct. 9, 1928 |
| 1,919,032 | Neulander | July 18, 1933 |
| 2,035,384 | Hinchliff | Mar. 24, 1936 |
| 2,036,876 | Kraft | Apr. 7, 1936 |
| 2,376,194 | Samuels | May 15, 1945 |
| 2,482,322 | Cortese | Sept. 20, 1949 |
| 2,522,381 | Kramer | Sept. 12, 1950 |